United States Patent
Langeard

(10) Patent No.: US 11,053,924 B2
(45) Date of Patent: Jul. 6, 2021

(54) OFFSHORE WIND TURBINE FLOATING SUPPORT AND ASSOCIATED INSTALLATION MEANS

(71) Applicant: DORIS ENGINEERING, Paris (FR)

(72) Inventor: Olivier Langeard, Antony (FR)

(73) Assignee: DORIS ENGINEERING, Paris (FR)

( * ) Notice: Subject to any disclaimer, the term of this patent is extended or adjusted under 35 U.S.C. 154(b) by 0 days.

(21) Appl. No.: 16/724,868

(22) Filed: Dec. 23, 2019

(65) Prior Publication Data
US 2020/0200150 A1    Jun. 25, 2020

(30) Foreign Application Priority Data
Dec. 24, 2018   (FR) ..................... 18 74136

(51) Int. Cl.
*B63B 35/44* (2006.01)
*F03D 13/25* (2016.01)

(52) U.S. Cl.
CPC .............. *F03D 13/25* (2016.05); *B63B 35/44* (2013.01); *B63B 2035/446* (2013.01)

(58) Field of Classification Search
CPC .... F03D 13/25; B63B 35/44; B63B 2035/446
See application file for complete search history.

(56) References Cited

U.S. PATENT DOCUMENTS

| | | | | |
|---|---|---|---|---|
| 8,471,396 | B2* | 6/2013 | Roddier | F03D 80/00 290/44 |
| 10,174,744 | B2* | 1/2019 | Aubault | B63B 39/03 |
| 2011/0037264 | A1* | 2/2011 | Roddier | F03D 9/25 290/44 |
| 2013/0233231 | A1* | 9/2013 | Dagher | F03D 13/25 114/265 |
| 2016/0195070 | A1* | 7/2016 | Li | B63B 21/502 416/244 A |
| 2016/0369780 | A1* | 12/2016 | Aubault | F03D 13/25 |
| 2019/0367136 | A1* | 12/2019 | Gatescoupe | B63B 35/44 |
| 2020/0032473 | A1* | 1/2020 | Berenguer Cobi n | E02D 27/425 |
| 2020/0063530 | A1* | 2/2020 | Bowie | B63B 1/125 |
| 2020/0200150 | A1* | 6/2020 | Langeard | B63B 43/04 |
| 2020/0269960 | A1* | 8/2020 | Boo | B63B 39/00 |

FOREIGN PATENT DOCUMENTS

| | | |
|---|---|---|
| FR | 3 052 817 A1 | 12/2017 |
| WO | 2018/096650 A1 | 5/2018 |
| WO | WO-2018096650 A1 * | 5/2018 ............. B63B 1/107 |

OTHER PUBLICATIONS

French Search Report, dated Sep. 11, 2019, from corresponding/related French Application No. 18 74136.

* cited by examiner

*Primary Examiner* — S. Joseph Morano
*Assistant Examiner* — Jovon E Hayes
(74) *Attorney, Agent, or Firm* — Nixon & Vanderhye

(57) ABSTRACT

This naval platform (14) supporting a wind turbine (12) for offshore electrical energy production comprises a main support column (24) of said wind turbine (12), and two secondary columns (26); each column including at least one shell having an outer surface delimiting an outer volume; the main column (24) being coupled to the two secondary columns (26).

The outer volume delimited by the shell (28A) of the main column (24) is greater than the respective outer volumes delimited by an outer surface of the shell (28B, 28C) of each secondary column (26).

17 Claims, 5 Drawing Sheets

OFFSHORE WIND TURBINE FLOATING SUPPORT AND ASSOCIATED INSTALLATION MEANS

The present invention relates to a naval platform supporting a wind turbine for offshore electrical energy production, comprising a main support column of said wind turbine, and two secondary columns; each column including at least one shell having an outer surface delimiting an outer volume; the main column being coupled to the two secondary columns.

BACKGROUND OF THE INVENTION

Wind turbine naval support platforms of the semisubmersible type are known by those skilled in the art.

In a naval installation comprising such a platform, the shells of the columns receive a quantity of ballast selected to move the center of gravity of the installation vertically with respect to its float center, so as to ensure the offshore horizontal position of the installation.

These platforms have the advantage of being particularly stable.

However, they are not fully satisfactory and their stability can be further improved.

SUMMARY OF THE INVENTION

One aim of the invention is therefore to provide a naval support platform for a wind turbine that is inexpensive to manufacture while having good stability at sea.

To that end, the invention relates to a naval platform of the aforementioned type wherein the outer volume delimited by the shell of the main column is greater than the respective outer volumes delimited by an outer surface of the shell of each secondary column.

The naval platform according to the invention may comprise one or more of the following features, considered alone or according to any technically possible combinations:

the outer volume delimited by the shell of the main column is greater by at least 20%, preferably by at least 50% than the respective outer volumes delimited by the shell of each secondary column;

for each column, a cross-section of the shell of the column has an outer contour defining an area, the area defined by the outer contour of the cross-section of the shell of the main column being greater than the area defined by the outer contour of the cross-section of the shell of at least one secondary column;

a cross-section of the shell of the main column for example has a geometric shape different from a cross-section of the shell of at least one secondary column;

for example, the cross-section of the shell of the main column is not homothetic to the cross-section of the shell of each secondary column;

a cross-section of each shell of the columns has a geometric shape respectively chosen from the group consisting of: an oval, an oblong shape, a rectangle, for example having rounded apices or having sharp corners, a parallelogram having rounded apices, a parallelogram having sharp corners;

each column respectively extends along an axis, a cross-section of the shell of each column being substantially constant along said axis of the column;

the shell of the main column has a height greater than the height of the shell of each secondary column;

seen from above, the main column is off-centered relative to a geometric center of the platform;

each secondary column is respectively coupled to the main column by means of a connecting arm, the connecting arms defining an angle between them of between 50° and 80°, preferably between 50° and 75°;

the shell of at least one secondary column has a rectangular cross-section, the rectangular shape having a larger axis, the larger axis having an offset angle with a reference line, the reference line being defined as passing through the geometric center of the cross-section of the shell of the main column and as being perpendicular to a reference line passing through the geometric centers of the cross-sections of the shells of the secondary columns, the offset angle being between 0° and 90°;

each shell of the secondary columns inwardly delimits ballast storage reservoirs;

the shell of the main column inwardly delimits ballast storage reservoirs;

the outer volume delimited by the shell of each of the columns is at least greater than 1500 m³; and the main column extends to an upper installation area of the wind turbine.

The invention also relates to a naval installation for producing offshore electrical energy, comprising a wind turbine and a naval support platform of this wind turbine, the naval platform being as defined above, the main column extending to an upper installation surface of the wind turbine on which the wind turbine is installed.

BRIEF DESCRIPTION OF THE DRAWINGS

The invention will be better understood upon reading the following description, provided solely as an example and done in reference to the appended drawings, in which.

DETAILED DESCRIPTION OF THE PREFERRED EMBODIMENTS

Figure 1:
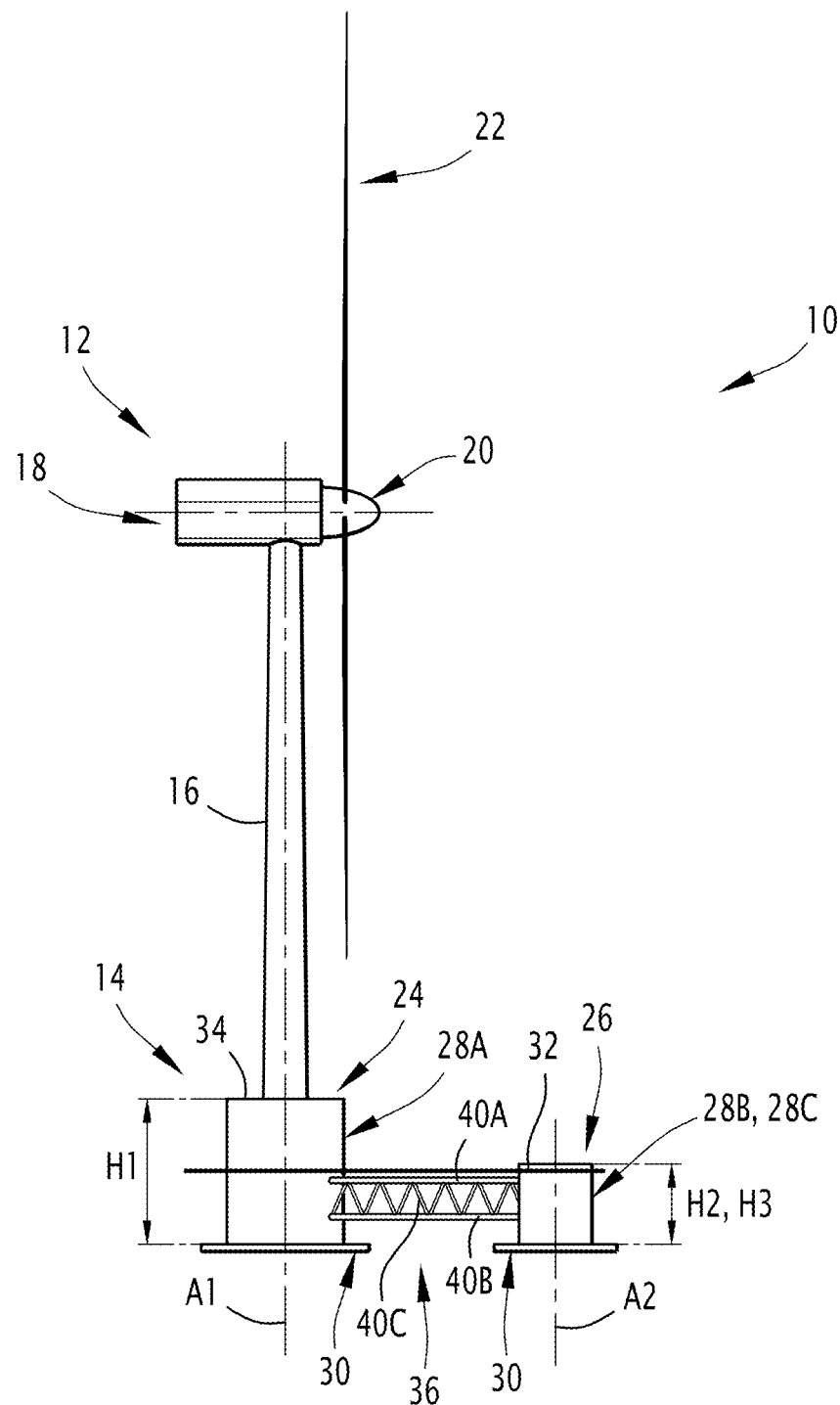
FIG. 1 is a schematic side view of a naval installation according to the invention.

FIG. 1 illustrates a naval installation 10 for producing offshore electrical energy according to the invention.

The installation comprises a wind turbine 12 and a naval platform 14 for supporting this wind turbine 12.

The wind turbine 12 typically comprises a support mast 16 fastened to the platform 14, a nacelle 18 positioned at the apex of the mast 16, and a rotor 20 including blades 22 and fastened on a shaft rotating in bearings installed in a cell 18.

Such a wind turbine 12 is known by those skilled in the art and will not be disclosed in more detail hereinafter.

The naval platform 14 is floating. In particular, it is of the semisubmersible type.

The naval platform 14 is for example suitable for being positioned in a zone where the seabed has a depth greater than 50 m.

The naval platform 14 comprises a main support column 24 of said wind turbine 12, and two secondary columns 26.

The naval platform 14 is coupled to the seabed by a mooring system, not shown.

The mooring system for example comprises at least three anchor lines coupling each column to an anchor positioned on the seabed.

The naval platform 14 in this example does not have other columns separate from the main and secondary columns 24, 26.

Each column 24, 26 respectively extends along an axis A1, A2, A3, qualified hereinafter as extension axis.

The extension axes A1, A2, A3 are for example parallel to one another.

Each extension axis A1, A2, A3 in particular extends substantially parallel to the following axis along which the mast 16 of the wind turbine 12 extends.

The extension axis A1, A2, A3 of each column 24, 26 is substantially vertical, but its incline relative to the horizontal varies as a function of weather conditions, such as the swell of the sea or the wind.

Each column 24, 26 in particular extends along its extension axis A1, A2, A3 between a lower surface and an upper surface, the upper and lower surfaces being substantially perpendicular to the extension axis A1, A2, A3.

Figure 2:
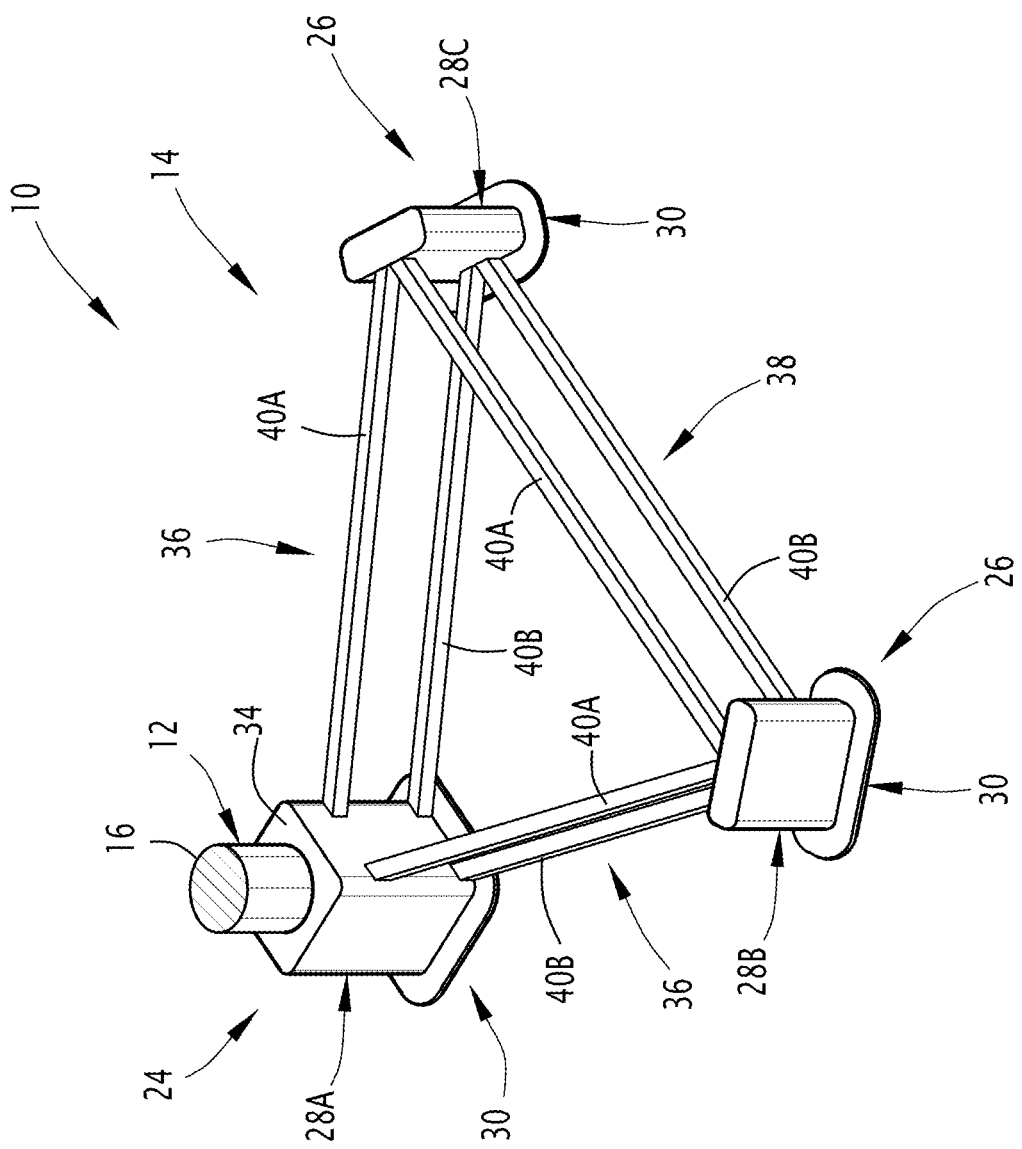
FIG. 2 is a schematic perspective view of the naval platform of the installation of FIG. 1.
Figure 3:
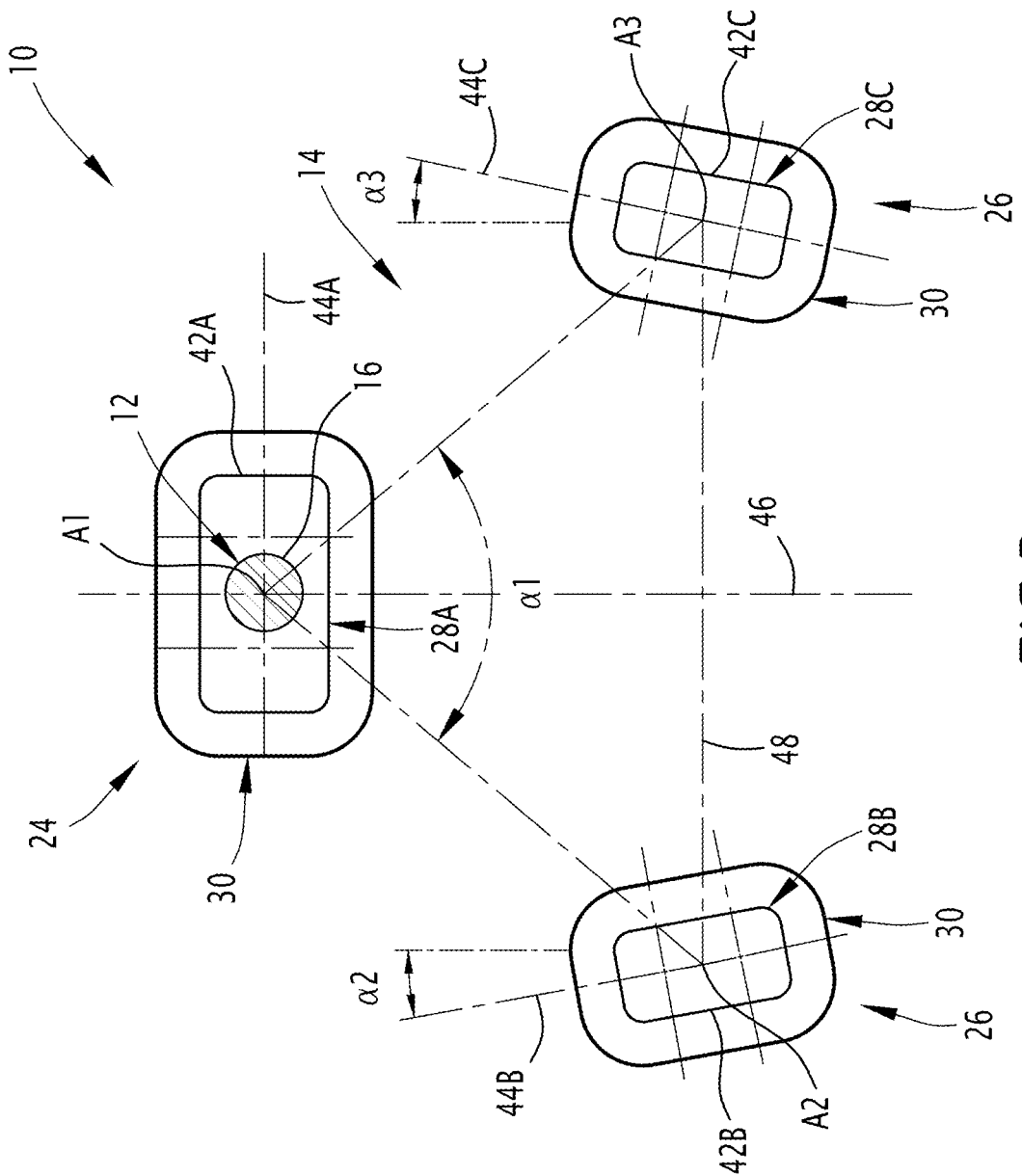
FIG. 3 is a schematic sectional view of the naval installation of FIG. 1.

As illustrated in FIGS. 2 and 3, each column 24, 26 comprises at least one shell 28A, 28B, 28C, and preferably a skirt 30 secured to the shell 28A, 28B, 28C and arranged below the shell 28A, 28B, 28C.

Preferably, the skirt 30 extends substantially radially relative to the extension axis, and protrudes relative to the shell 28A, 28B, 28C.

Stiffeners, not shown, for example join the outer surface of each shell 28A, 28B, 28C with the skirt 30 positioned below the shell.

At least part of an outer surface of each shell 28A, 28B, 28C is in contact with the water surrounding the naval platform 14.

Furthermore, as illustrated in FIG. 1, in a calm sea, the body of water 32 intersects the shells 28A, 28B, 28C.

In particular, once the installation 10 is installed offshore, and in a calm sea, at least 10 m for example of the height of the shell 28A of the main column 24 is above sea level.

The outer surface of each shell 28A, 28B, 28C delimits a volume that will be referred to as "outer volume" hereinafter.

The outer volume delimited by the shell 28A, 28B, 28C of each of the columns 24, 26 is at least greater than 1500 m³.

Each shell 28A, 28B, 28C has an inner surface that also delimits an inner volume.

Each shell 28A, 28B, 28C is for example made from steel. Each shell 28A, 28B, 28C is then for example made from stiffened sheets, and has a shell thickness for example of between 10 mm and 30 mm.

In a variant, each shell 28A, 28B, 28C is for example made from concrete. Each shell 28A, 28B, 28C is then for example built from stiffened plates, and has a plate thickness for example of between 150 mm and 600 mm.

The main column 24 in particular extends up to an upper installation surface 34 of the wind turbine 12 on which the wind turbine 12 is installed and fastened.

More specifically, the mast 16 of the wind turbine 12 has a lower end fastened to the upper installation surface 34 of the main column 24.

This upper installation surface 34 here corresponds to an upper surface of the shell 28A of the main column 24.

The shell 28A of the main column 24 for example inwardly comprises a support reinforcing structure of the wind turbine 12.

Each support reinforcing structure is received in the inner volume of the shell.

Each support reinforcing structure comprises horizontal and vertical reinforcing plates fastened to the shell 28A.

At least one of the vertical reinforcing plates is fastened to an upper inner surface of the shell. Likewise, at least one of the vertical reinforcing plates is fastened to a lower inner surface of the shell.

The main column 24 here is off-centered relative to the platform 14. In particular, as illustrated in FIG. 3, in top view, it has an offset geometric center relative to the overall geometric center of the platform 14.

"Geometric center" in particular refers to an isobarycenter.

Given that it is off-centered, the wind turbine 12 is installed more easily on the main column 24 by a crane, during the assembly of the naval installation 10.

The secondary columns 26 here are also off-centered and laterally offset relative to the main column 24.

The main column 24 is coupled to the two secondary columns 26.

In particular, as illustrated in FIG. 2, each secondary column 26 is respectively coupled to the main column 24 by means of a connecting arm 36, the connecting arms 36 defining an angle α1 between them of between 50° and 80°, preferably between 50° and 75°.

The connecting arms 36 are for example of equal length.

Additionally, the secondary columns 26 are coupled to one another by another connecting arm 38, separated from the main column 24. This other arm 38 is referred to hereinafter as "secondary arm".

Each arm 36, 38 is fastened to the outer surface of the shells 28A, 28B, 28C.

Each arm 36, 38 for example extends substantially perpendicular to the extension axes of the columns 24, 26.

Each arm 36, 38 comprises at least one beam.

In the example of FIG. 1, each arm 36, 38 comprises an upper beam 40A, a lower beam 40B, and preferably stiffeners 40 joining the two beams 40A, 40B. In a variant, each arm 36, 38 only comprises a single beam.

Each beam 40A, 40B extends longitudinally between two opposite longitudinal ends, each longitudinal end being fastened to the outer surface of one of the shells 28A, 28B, 28C.

Each beam 40A, 40B has a diameter for example between 1 m and 4 m.

Each stiffener 40C for example has a diameter smaller than that of each beam 40A, 40B of the arm, and preferably between 0.5 m and 3 m.

For clarity reasons, the stiffeners joining the two beams 40A, 40B have not been shown in FIG. 2 and the arms 36, 38 have not been shown in FIG. 3.

The secondary columns 26 are designed to ensure the stability of the installation 10 while keeping the geometric center as close as possible to the center of gravity.

To that end, each shell 28B, 28C of the secondary columns 26 inwardly delimits ballast storage reservoirs, not shown.

Additionally, the shell 28A of the main column 24 inwardly delimits ballast storage reservoirs, not shown.

Once the installation 10 is positioned offshore, the reservoirs store ballast, for example solid and/or liquid, in order to perform this function.

The inner volume of the shell 28A, 28B, 28C of each column 24, 26 for example also receives equipment for monitoring and maintenance of the naval platform 14.

In one exemplary embodiment, the shells 28B, 28C of the secondary columns 26 have substantially identical dimensions.

Furthermore, to ensure that, in a calm sea, the float center of the installation 10 is positioned so as to be aligned vertically with its center of gravity, the secondary columns 26 have a smaller outer volume compared with the main column 24.

In particular, the outer volume delimited by the shell 28A of the main column 24 is greater than the respective outer volumes delimited by the shell 28B, 28C of each secondary column 26, as illustrated in FIGS. 1 to 3.

Advantageously, the outer volume delimited by the shell 28A of the main column 24 is greater by at least 20%, preferably by at least 50%, than the respective outer volumes delimited by the shell 28B, 28C of each secondary column 26.

As illustrated in FIGS. 1 and 2, the shell 28A of the main column 24 has a height H1 greater than the height H2, H3 of each hull 28B, 28C of the secondary columns 26.

Each height here is in particular taken along the respective extension axis of the column 24, 26.

In particular, the shell 28A, of the main column 24, has a height H1 greater by at least 10%, preferably at least 20%, than, the height H2, H3 of the shell 28B, 28C of each secondary column 26.

Each shell 28A, 28B, 28C of the columns 24, 26 has a cross-section, taken perpendicular to the extension axis of the column, that is substantially constant along the extension axis of the column.

More specifically, for each column 24, 26, the cross-section of the shell 28A, 28B, 28C of the column has an outer contour 42A, 42B, 42B defining a substantially constant area along the extension axis.

As illustrated in FIGS. 2 and 3, the area defined by the outer contour 42A of the cross-section of the shell 28A of the main column 24 is greater than the area defined by the outer contour 42B, 42C of the cross-section of the shell 28B, 28C of at least one, here each, secondary column 26.

In particular, the area defined by the outer contour 42A of the cross-section of the shell 28A of the main column 24 is greater by at least 20%, preferably by at least 50%, than the area defined by the outer contour 42B, 42C of the cross-section of the shell 28B, 28C of at least one, and here each, secondary column 26.

In the example of FIG. 3, the cross-section of the shell 28A of the main column 24 is homothetic to the cross-section of the shell 28B, 28C of each secondary column 26.

The cross-section of each shell 28A, 28B, 28C here for example has a rectangular geometric shape having rounded apices.

"A cross-section having a geometric shape" here refers to the geometric shape of the outer contour of this cross-section.

One skilled in the art will understand that the cross-section of the shells can have irregularities. Thus, "the section has a predetermined shape" means that the exact shape of the contour of said section does not deviate from the predetermined shape by more than 20% of the maximum size of the predetermined shape, preferably by more than 10% of the maximum size of the predetermined shape.

In particular, the columns 24, 26 can outwardly have appended structures attached on the shells 28A, 28B, 28C. Such appended structures are for example lateral scales making it possible to berth boats, moor boats and access the platform or railings at the apices of the shells, devices for anchoring of the platform and devices for electrical connection and inspection and measurement.

One skilled in the art will understand that these appended structures do not substantially modify the buoyancy properties of each column.

As illustrated in FIG. 3, for each column 24, 26, the rectangular geometric shape has a larger axis, referenced 44A, 44B, 44C, respectively, passing through the respective geometric center of each section.

In one exemplary embodiment, no larger axis 44B, 44C of each secondary column 26 passes between the arms 36, 38. In a variant, at least one or each larger axis 44B, 44C passes between the arms 36, 38.

For each secondary column 26, said larger axis 44B, 44C has an offset angle $\alpha 2$, $\alpha 3$ of between 0° and 90° with a reference line referenced 46 in FIG. 3 and defined hereinafter.

Advantageously, each offset angle $\alpha 2$, $\alpha 3$ is between 10° and 50°.

This reference line 46 is defined as passing through the geometric center of the cross-section of the shell 28A of the main column 24 and as being perpendicular to a line 48 passing through the geometric centers of the cross-sections of the shells 28B, 28C of the secondary columns 26.

The respective offset angles $\alpha 2$, $\alpha 3$ here are equal. Alternatively, they are different.

In the example of FIG. 3, the reference line 46 corresponds to the smaller axis of the shell 28A of the main column 24.

Additionally, the larger axis 44A of the cross-section of the shell 28A of the main column 24 is for example parallel to the secondary connecting arm 38.

The larger axes 44B, 44C of the secondary columns 26 intersect at an intersection point. For example, projected on the reference line 46, each of the shells 28B, 28C of the secondary columns 26 is positioned between said intersection point and the shell 28A of the main column 24.

Each offset angle $\alpha 2$, $\alpha 3$ is in particular defined opposite said intersection point.

During the design of the naval platform 14, the geometric shapes and the dimensions of the cross-section of each shell 28A, 28B, 28C, the heights H1, H2, H3 of each shell, the length of the connecting arms 36 and 38, the angle $\alpha 1$ between the connecting arms 36, and the offset angles $\alpha 2$, $\alpha 3$ defined hereinabove are optimized to ensure optimal stability of the installation 10 under the load of the wind turbine while ensuring a reduction in the weight of the naval platform 14.

This optimization is for example implemented by a genetic algorithm.

In a variant, the shell 28A of the main column 24 has a height H1 greater than the height H2, H3 of each shell 28B, 28C of the secondary columns 26, without the cross-section of the shell 28A of the main column 24 being different from that of the secondary columns 26.

In another variant, the area defined by the outer contour 42A of the cross-section of the shell 28A of the main column 24 is greater than the area defined by the outer contour 42B, 42C of the cross-section of the shell 28B, 28C of each secondary column 26, without the height H1 of the shell 28A of the main column 24 being greater than the height H2, H3 of each shell 28B, 28C of the secondary columns 26.

In a variant, the geometric shape of the cross-section of each shell 28A, 28B, 28C of the columns is respectively chosen from the group consisting of: an oval, an oblong shape, a parallelogram having rounded apices or having sharp corners, and a rectangle having rounded apices or having sharp corners.

In another variant, the cross-section of the shell 28A of the main column 24 is not homothetic to that of each secondary column 26.

For example, the cross-section of the shell 28A, 28B, 28C of each column 24, 26 can respectively have a rectangular geometric shape, without the cross-section of the shell 28A of the main column 24 being homothetic to that of the secondary columns 26.

In still another variant, the geometric shape of the cross-section of the shell 28A of the main column 24 is different from that of the shell 28B, 28C of at least one of the secondary columns 26. These different geometric shapes are then also chosen for example from the group above.

In a variant, not shown, the larger axis of the cross-section of the shell 28B, 28C of at least one secondary column 26 is parallel to said reference line 46 defined hereinabove.

In another variant, the geometric shape of the cross-section of the shell 28A of the main column 24 is square.

In still another variant, the geometric shape of the cross-section of each shell 28B, 28C of the secondary columns 26 is a hexagon, preferably regular. Furthermore, the skirt 30 of each secondary column 26 for example has a hexagonal geometric shape, preferably regular, seen from above.

Alternatively, the geometric shape of the cross-section of the shell 28A of the main column 24 is square and the geometric shape of the cross-section of each shell 28B, 28C of the secondary columns 26 is a circle. Furthermore, the skirt 30 of each secondary column 26 for example has a circular geometric shape, seen from above.

A second exemplary embodiment of an offshore naval installation 10 for producing electrical energy according to the invention will now be described, in reference to FIGS. 4 and 5.

Only the differences between this second exemplary embodiment and that of FIGS. 1 to 3 will be disclosed below.

Figure 4:
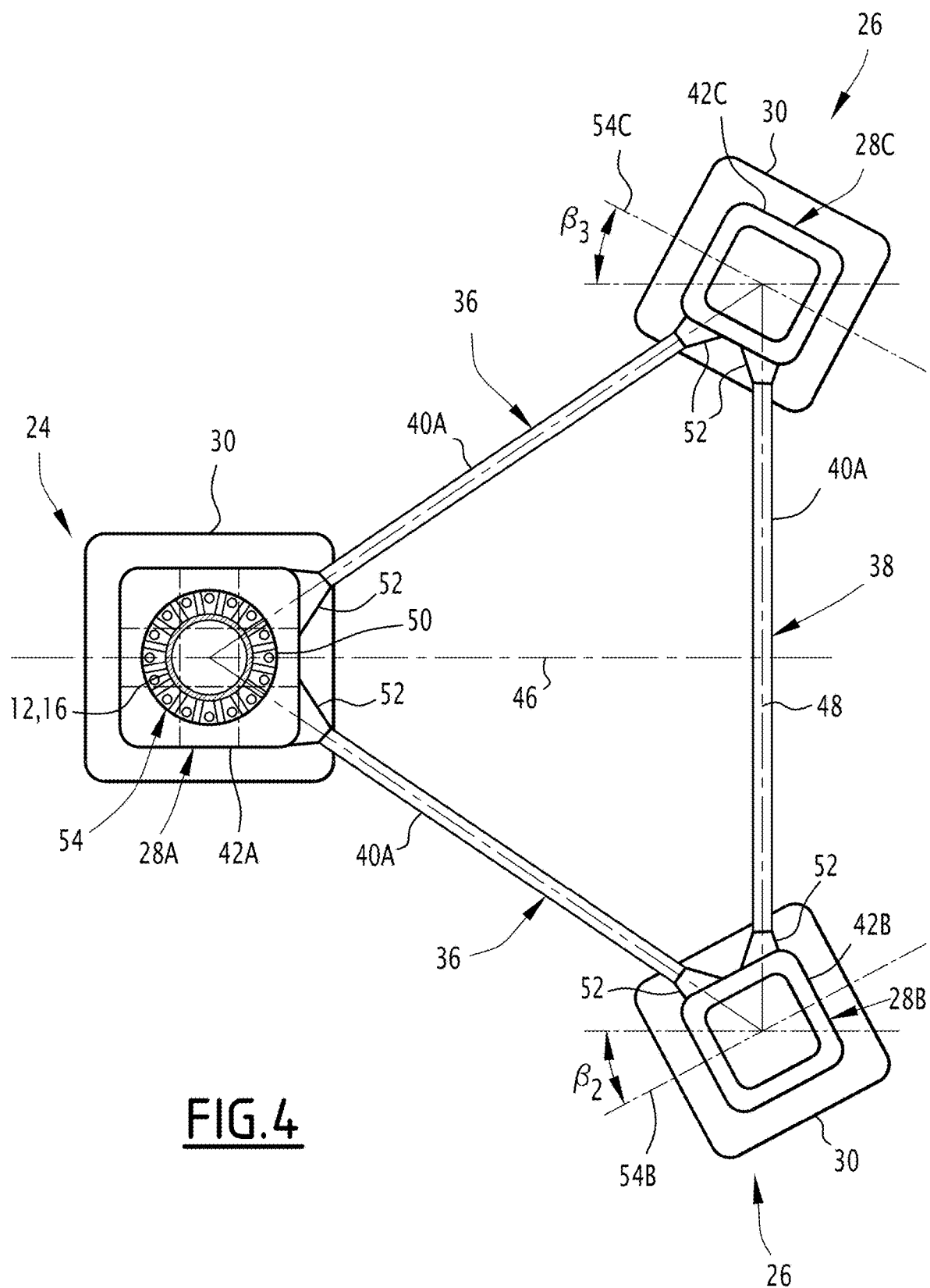
FIG. 4 is a schematic sectional top view of a second embodiment of the naval installation.

In the example of FIG. 4, the geometric shape of the cross-section of each shell 28A, 28B, 28C of the columns is square.

Additionally, the skirt 30 of each column 24, 26 has a square geometric shape, seen from above.

In the second embodiment, the main column 24 also comprises a transitional part 50 between the mast 16 of the wind turbine 12 and the shell 28A.

The transitional part 50 is fixed on the shell 28A of the main column 24.

The mast 16 of the wind turbine 12 is fastened on the transitional part 50.

The upper installation surface 34 then corresponds to an upper surface of the transitional part 50.

In particular, the transitional part 50 and the mast 16 are fastened to one another by a system of flanges 54. The system of flanges 54 comprises a flange secured to the transitional part 50 and a flange secured to the mast 16.

Figure 5:
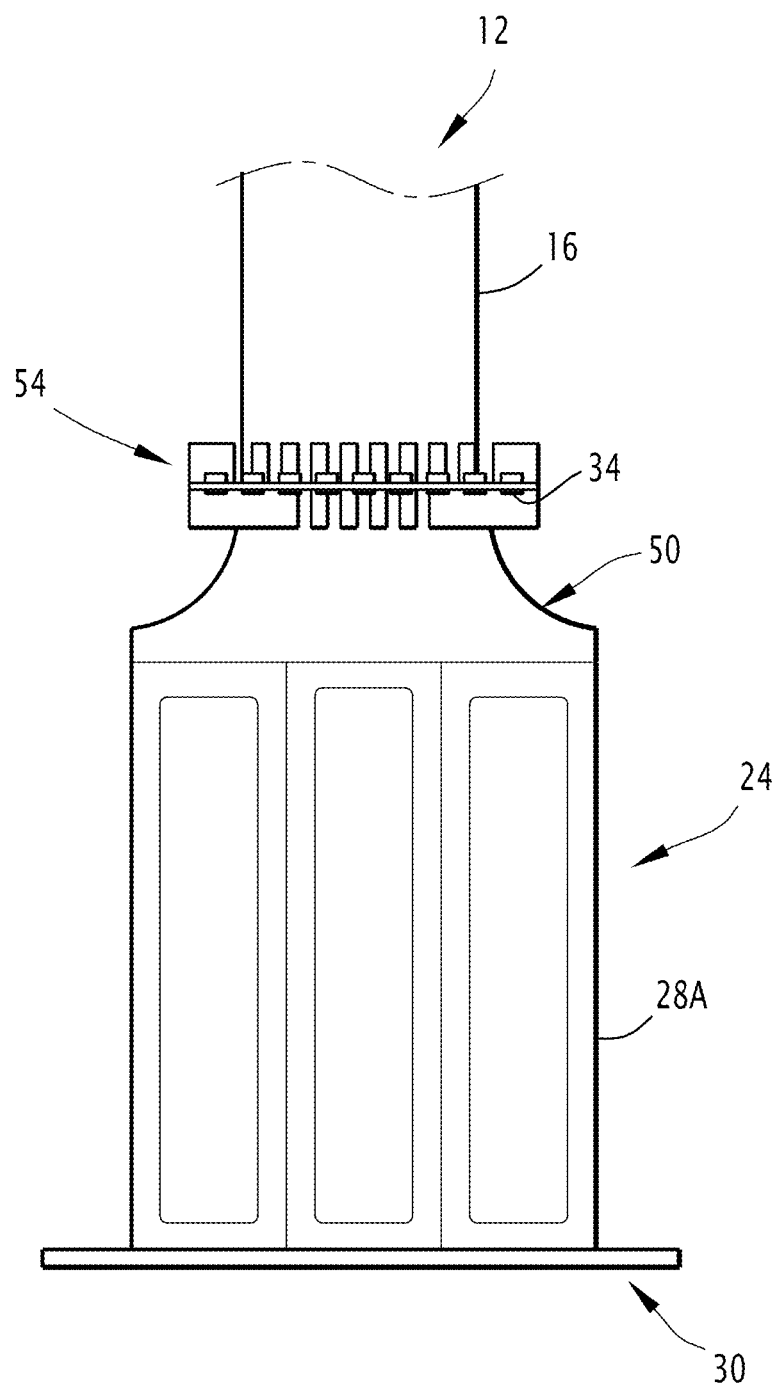
FIG. 5 is a schematic side view of the main column of the installation of FIG. 4.

Advantageously, as illustrated in FIG. 5, the transitional part 50 has a cross-section, considered perpendicular to the extension axis of the main column 24, that is variable along the extension axis.

In particular, the cross-section of the transitional part 50 decreases from the shell 28A toward the lower end of the mast 16 of the wind turbine 12.

At the shell 28A, the transitional part 50 has a cross-section substantially corresponding to the cross-section of the shell 28A.

Additionally, at the lower end of the mast 16 of the wind turbine 12, the transitional part 50 has a cross-section substantially corresponding to the section of the mast 16.

As illustrated in FIG. 4, for each secondary column 26, the square geometric shape of the section has an orientation axis, referenced 54B, 54C, the orientation axis being parallel to one of the sides of the square section, passing through the geometric center of the section and not passing between the arms 36, 38.

For each secondary column 26, said orientation axis 54B, 54C has an offset angle $\beta 2$, $\beta 3$ of between 0° and 90° with a reference line referenced 46 in FIG. 3 and defined hereinafter.

Advantageously, each offset angle $\beta 2$, $\beta 3$ is between 10° and 50°.

This reference line 46 is defined as passing through the geometric center of the cross-section of the shell 28A of the main column 24 and as being perpendicular to a line 48 passing through the geometric centers of the cross-sections of the shells 28B, 28C of the secondary columns 26.

The respective offset angles $\beta 2$, $\beta 3$ here are equal. Alternatively, they are different.

In the example of FIG. 3, the reference line 46 is parallel to one of the sides of the square section of the shell 28A of the main column 24.

The orientation axes 54B, 54C of the secondary columns 26 intersect at an intersection point. For example, projected on the reference line 46, each of the shells 28B, 28C of the secondary columns 26 is positioned between said intersection point and the shell 28A of the main column 24.

Each offset angle $\beta 2$, $\beta 3$ is in particular defined opposite said intersection point.

Furthermore, the platform preferably comprises, at least at one of the longitudinal ends of at least one of the beams 40A, 40B of the arms 36, 38, a bracket 52 transmitting force between the beam and one of the columns 24, 26.

Advantageously, the platform comprises, at each longitudinal end of each beam 40A, 40B of the arms 36, 38, one such bracket.

In particular, each beam has a slit receiving the bracket, the bracket being fastened to the beam 40A, 40B and the outer surface of one of the shells 28A, 28B, 28C.

Each bracket is planar and is for example made from steel, preferably in the case of columns made from the same material.

These brackets 52 improve the reaction of forces between the arms 36, 38 and the shells 28A, 28B and 28C.

Preferably, the platform preferably comprises, at least at one of the longitudinal ends of at least one of the beams 40A, 40B of the arms 36, 38, two bracket 52 transmitting force between the beam 40A, 40B and one of the shells 28A, 28B, 28C.

A first of the two brackets 52 is then arranged substantially horizontal and a second of the two brackets 52 is arranged substantially vertical.

Owing to the features previously described, in particular owing to the outer volume of the shell 28A of the main column 24 greater than that of the secondary columns 26, the float center can be chosen as close as one wishes to the main column 24. The stability of the offshore installation 10 is therefore improved as a result.

Furthermore, it is possible to reduce the mass of the assembly, in particular the added ballast mass, for similar stability performance.

The invention claimed is:

1. A naval platform supporting a wind turbine for offshore electrical energy production, comprising:

a main support column of said wind turbine; and two secondary columns, each of the two secondary columns comprising at least one shell having an outer surface delimiting an outer volume, and the main support column being coupled to the two secondary columns, wherein an outer volume delimited by a shell of the main support column is at least 20% greater than respective outer volumes delimited by an outer surface of the shell of each secondary column.

2. The platform according to claim 1, wherein the outer volume delimited by the shell of the main support column is at least 50% greater than the respective outer volumes delimited by the shell of each secondary column.

3. The platform according to claim 1, wherein, for each column, a cross-section of the shell of the column has an outer contour defining an area, the area defined by the outer contour of the cross-section of the shell of the main support column being greater than the area defined by the outer contour of the cross-section of the shell of at least one of the two secondary columns.

4. The platform according to claim 1, wherein a cross-section of the shell of the main support column has a geometric shape different from a cross-section of the shell of at least one of the two secondary columns.

5. The platform according to claim 1, wherein the cross-section of the shell of the main support column is not homothetic to the cross-section of the shell of each secondary column.

6. The platform according to claim 1, wherein a cross-section of each shell of the columns has a geometric shape selected from the group consisting of: an oval, an oblong shape, a rectangle shape, a rectangle having rounded apices, a parallelogram shape, and a parallelogram having rounded apices.

7. The platform according to claim 1, wherein each column extends along a respective axis, a cross-section of the shell of each column being substantially constant along the axis of the column.

8. The platform according to claim 1, wherein the shell of the main support column has a height greater than a height of the shell of each secondary column.

9. The platform according to claim 1, wherein, seen from above, the main support column is off-centered relative to a geometric center of the platform.

10. The platform according to claim 1, wherein each secondary column is respectively coupled to the main support column by means of a connecting arm, the connecting arms defining an angle comprised between 50° and 80°.

11. The platform according to claim 1, wherein the shell of at least one of the two secondary columns has a rectangular cross-section, a larger axis of the rectangular shape defining an offset angle with a reference line, the reference line being defined as passing through the geometric center of the cross-section of the shell of the main support column and as being perpendicular to another line passing through the geometric centers of the cross-sections of the shells of the two secondary columns, and the offset angle being comprised between 0° and 90°.

12. The platform according to claim 11, where the offset angle is comprised between 10° and 50°.

13. The platform according to claim 1, wherein each shell of the two secondary columns inwardly delimits ballast storage reservoirs.

14. The platform according to claim 1, wherein the outer volume delimited by the shell of each of the columns is at least greater than 1500 m$^3$.

15. A naval installation for producing offshore electrical energy, comprising a wind turbine and a naval support platform of this wind turbine, the naval platform being according to claim 1, the main column extending to an upper installation surface of the wind turbine on which the wind turbine is installed.

16. A naval platform supporting a wind turbine for offshore electrical energy production, comprising:

a main support column of said wind turbine; and two secondary columns, each of the two secondary columns comprising at least one shell having an outer surface delimiting an outer volume, and the main support column being coupled to the two secondary columns, wherein the outer volume delimited by the shell of the main support column is greater than the respective outer volumes delimited by an outer surface of the shell of each secondary column, and wherein a cross-section of the shell of the main support column has a geometric shape different from a cross-section of the shell of at least one of the two secondary columns, and/or the shell of the main support column has a height greater than the height of the shell of each secondary column, and/or the outer volume delimited by the shell of each of the columns is at least greater than 1500 m$^3$.

17. A naval platform supporting a wind turbine for offshore electrical energy production, comprising:

a main support column of said wind turbine; and two secondary columns, each of the two secondary columns comprising at least one shell having an outer surface delimiting an outer volume, and the main support column being coupled to the two secondary columns, wherein the outer volume delimited by the shell of the main support column is greater than the respective outer volumes delimited by an outer surface of the shell of each secondary column, and wherein the shell of at least one of the two secondary columns has a rectangular cross-section, a larger axis of the rectangular shape defining an offset angle with a reference line, the reference line being defined as passing through the geometric center of the cross-section of the shell of the main support column and as being perpendicular to another line passing through the geometric centers of the cross-sections of the shells of the two secondary columns, and the offset angle being comprised between 0° and 90°.

* * * * *